United States Patent [19]

Persha et al.

[11] 4,123,699
[45] Oct. 31, 1978

[54] VERTICALLY SCANNING MICROFILM READER AND READER PRINTER

[75] Inventors: Thomas J. Persha, Juneau; David Jagielski, West Bend, both of Wis.

[73] Assignee: Bell & Howell Company, Chicago, Ill.

[21] Appl. No.: 836,207

[22] Filed: Sep. 23, 1977

Related U.S. Application Data

[63] Continuation of Ser. No. 675,656, Apr. 12, 1976, abandoned.

[51] Int. Cl.² .................. G03B 23/12; G03B 1/48; G03B 21/14
[52] U.S. Cl. ...................... 353/26 R; 353/96; 353/101
[58] Field of Search ............ 353/26 A, 26 R, 95, 353/101, 96

[56] References Cited

U.S. PATENT DOCUMENTS

| | | | |
|---|---|---|---|
| 2,130,562 | 9/1938 | Pratt | 353/26 R |
| 3,241,440 | 3/1966 | Kugler | 353/55 |
| 3,809,468 | 5/1974 | Moritz | 353/26 R |

*Primary Examiner*—Steven L. Stephan
*Attorney, Agent, or Firm*—Harry G. Thibault; Alan B. Samlan

[57] ABSTRACT

The inventive microfilm reader and reader-printer has a film gate which is anchored to the chassis of the reader or reader-printer and which is entirely separate from a light system, lens mount, and focusing system which float up and down with respect to the film gate and chassis. The floating system is mounted on an elevator mechanism which lifts or lowers it relative to the film gate to scan across the width of the film. A prism is included in the lens system to rotate and vertically align the projected image. A combination of the movements of the elevator mechanism and prism enables any vertical segment of the microfilm to be scanned, selected, and read in a vertical orientation.

3 Claims, 5 Drawing Figures

VERTICALLY SCANNING MICROFILM READER AND READER PRINTER

This is a continuation of application Ser. No. 675,656, filed Apr. 12, 1976 now abandoned.

This invention relates to microfilm readers and reader-printers and more particularly to readers or reader-printers which may scan across the width of a microfilm without requiring a refocusing of a projected image.

Microfilm readers and reader-printers are well known devices for projecting images which are photographically stored on a strip of microfilm. Sometimes images are stored in a manner wherein it is inconvenient or impossible to project the entire width of film as a single picture. For example, the resulting image may be too small to read conveniently or several different images may be printed side-by-side across the width of the film.

When it is necessary or desirable to project less than the images across an entire width of microfilm, means should be provided for scanning across the width of the film. For example, means should be provided for projecting an image appearing on one half of a film at one time and for projecting another image appearing on the other half of the film at another time. Therefore, it is necessary to move the film or the lens relative to each other, in order to scan across the width of the film.

Another problem is that the images may not be positioned on the film with as much precision as is desirable. For example, images may be skewed when the film is made so that they are not completely vertical when they are projected. Therefore, it is not only necessary to scan across the width of the film, but is also necessary to rotate and orient an image in a vertical reading position.

A difficulty with these scanning and orienting movements is that they usually affect the focus so that the operator of the microfilm reader or reader-printer is continuously adjusting the focus.

Accordingly, an object of this invention is to provide new and improved microfilm readers and reader-printers which are capable of scanning across the width of a microfilm and of vertically orienting an image, without requiring a new focusing. In this connection, an object is to provide a microfilm reader or reader-printer wherein the film transport mechanism is anchored independently of the lens mount and focusing system. Here an object is to move lens mount and focusing mechanism independently of the film, thereby enabling the lens mount to scan the film.

Still aother object of the invention is to provide a smoother and more positive and trouble-free vertical scanning for a microfilm reader or reader-printer, as compared to prior art scanning devices.

In keeping with an aspect of the invention, these and other objects are accomplished by providing a film gate which is firmly anchored with respect to a floating lens mount and focusing system. The floating system is mounted on an elevator mechanism which lifts or lowers the lens, relative to the anchored film gate. A prism is included in the lens system to rotate the projected image. A combination of the movements of the elevator mechanism and the prism enables any vertical section of the microfilm to be selected and read in a vertical orientation.

The nature of a preferred embodiment of the invention will become more apparent from a study of the attached drawings, wherein.

Figures 1, 3, 4:
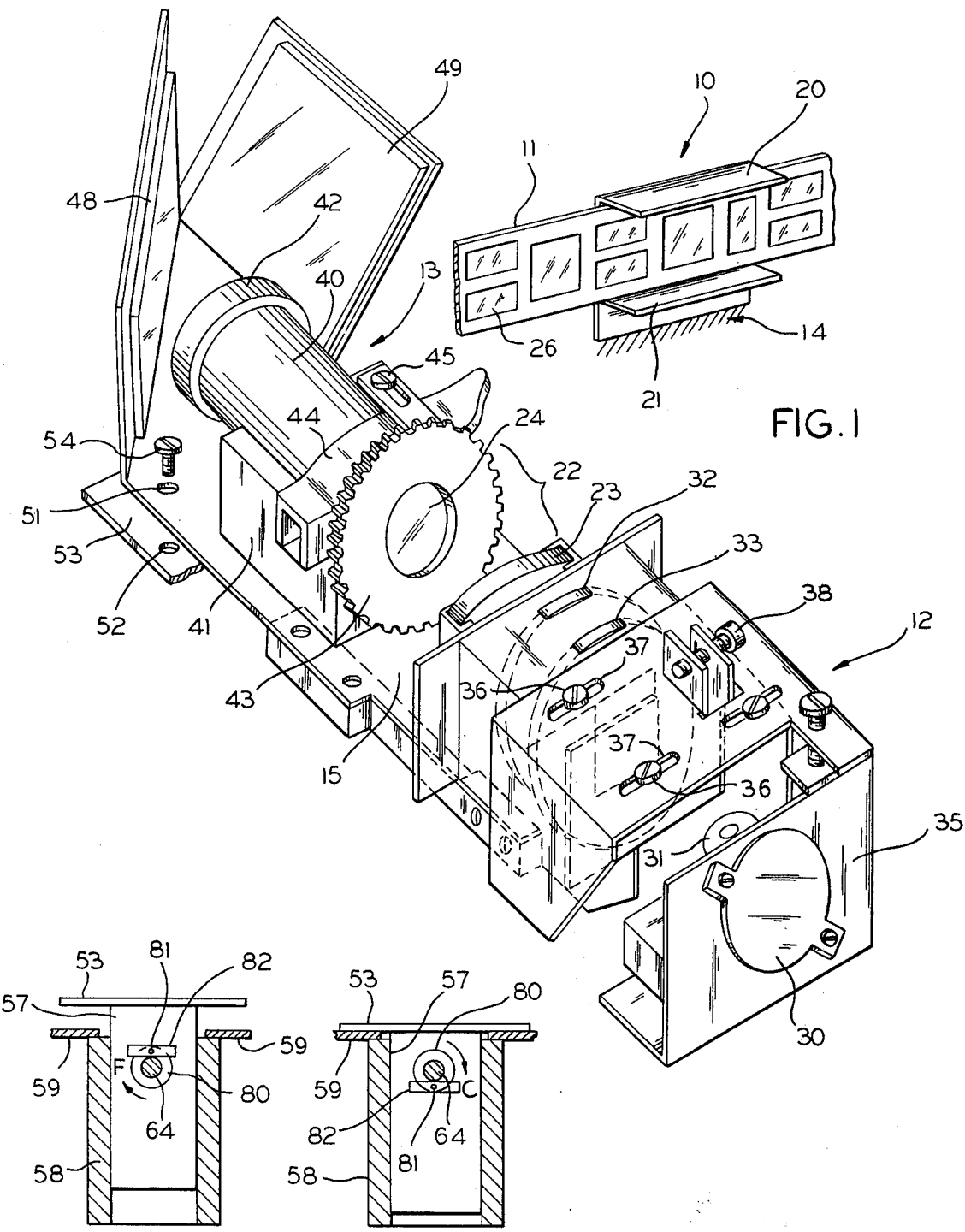
FIG. 1 is a partially exploded view, in perspective, of a lens mount and film gate.
FIG. 3 is a side elevation cross-section view showing the elevator in a raised position.
FIG. 4 is a similar view showing the elevator in a lowered position.

The major subassemblies of FIG. 1 are a film gate 10 with a strip of microfilm 11 therein, light system 12 and optical projection lens system 13. Film gate 10 is firmly anchored (as indicated by ground hatching 14) on the chassis of a microfilm reader. The light system 12 and optical lens system 13 are mounted on a base plate 15 which may be raised or lowered relative to the chassis (and therefore the film gate 10) of a microfilm reader.

The film gate 10 may take any of many well known forms; however, it will have upper and lower guides 20, 21 which guide and direct the strip of microfilm 11 as it is transported through the reader. This film gate fits into space 22, between a heat absorption lens 23 and an optical projection lens 24. Therefore, as the film strip 11 is transported through the film gate 10, each image (such as 26) may be positioned to be projected through the optical lens 24.

The light system 12 comprises a sector of a spherical reflector 30, a light bulb 31, a pair of condenser lens 32, 33, and the heat absorbing lens 23. These parts are supported and held together by any suitable mechanical brackets, such as 35, for example. Suitable means are provided for mechanically adjusting the alignment of these parts. For example, locking screws (such as 36) may be loosened so that the anchored brackets secured thereby may be slid back and forth within the range provided by the elongated slots 37. Then, the screws 36 may be tightened to anchor the brackets in a selected place. A set screw 38 may also be provided to enable precise adjustments of these brackets.

The optical lens system comprises a telescoping barrel 40 containing suitable projector lenses and resting in a cradle mount 41. The barrel may be telescoped in any suitable manner to focus the projected image upon a suitable screen. An enlarged end 42 limits the retracted position of the optical lens system, and a thumb wheel 43 limits the extended position of the lens mount 40. Any suitable bracket or other mechanism 44 may be used to capture and hold the lens barrel 40 in the cradle mount 41. Bracket 44 is held in place by screw 45. The barrel also includes a prism (not shown) which rotates with the rotation of the thumb wheel 43, to adjust the vertical alignment of the projected image responsive to a rotation of the thumb wheel.

Mechanically, the entire assembly of FIG. 1 is enclosed by a housing (FIG. 5) which enables the upper segment of thumb wheel 43 to be manipulated by an operator. Two mirrors 48, 49 are positioned in front of the projector lens barrel 40 to reflect the image onto a screen, also seen in FIG. 5. It should now be apparent how microfilm image 26 may be placed in front of light system 12 and in an optical path projected through lens system 13 and reflected onto a suitable screen, with any desired vertical alignment selected by operation of the thumb wheel 43.

According to the invention, the light system 12 and optical lens system 13 are firmly mounted on a common and rigid support plate 15 so that they may be moved up and down relative to a chassis. However, the film gate is rigidly mounted on the chassis so that it remains in a fixed position, as the base plate moves. Therefore, the optical lens system may be moved to scan across the width of the film, as it is raised and lowered.

Figure 2:
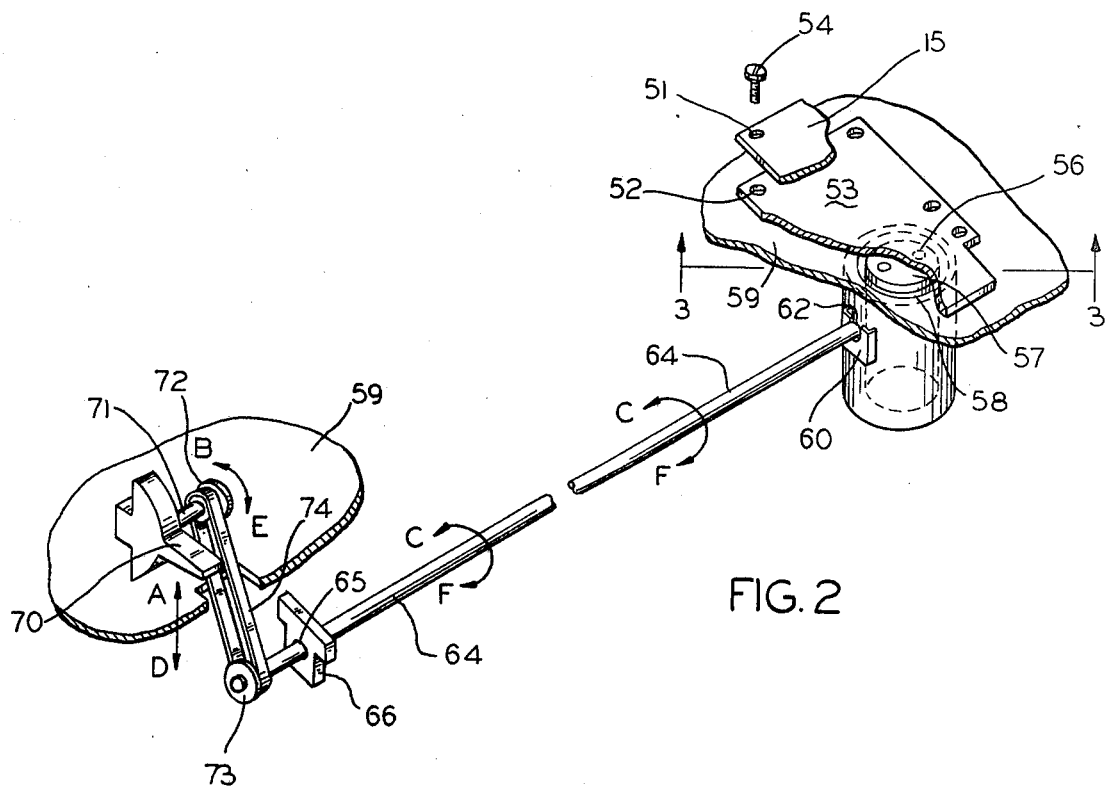
FIG. 2 is a perspective view of a support plate and an inventive elevator mechanism.

FIG. 2 shows the elevator system for raising and lowering the light and lens system 12, 13. The light and lens systems may be mounted directly on an elevator plate 53 which is adapted to move up and down. Or, the light and lens system may be mounted on a base plate 15 which has a number of screw holes (such as 51) superimposed over corresponding holes (such as 52) on the elevator plate 53 to receive screws (such as 54) for attaching the light and lens systems to the elevator mechanism.

As here shown, the elevator plate 53 is bolted at 56 directly to a vertically movable shaft 57 which telescopingly slides within a mating vertical tube 58 fixed to chassis 59. Since the top of tube 58 is secured to the chassis 59, the elevator tube is immobile. Therefore, as the shaft 57 slides up and down in the tube 58, the elevator plate 53 also moves up and down relative to the chassis and therefore relative to the film gate 10. A bracket 60 is secured to the outside of the tube 58 to support a bearing 62 for rotatably holding the end of a horizontal shaft 64. The other end of shaft 64 is rotatably mounted in a bearing 65 on bearing block 66.

The control the elevator mechanism, a control lever 70 is mounted on the end of a second horizontal shaft 71, which is rotatably supported in any suitable manner, parallel to the shaft 64. Pulley 72 is mounted on shaft 71 opposite a pulley 73 mounted on the shaft 64, with a drive belt 74 therebetween. It should now be apparent that, if lever 70 is raised in direction A, shaft 71 rotates in direction B and shaft 64 rotates in direction C. Or, if lever 70 is lowered in direction D, shaft 71 rotates in direction E and shaft 64 rotates in direction F. Usually, the desired amount of rotary motion is selected by watching an image come into focus on a screen. Therefore, pulley wheels and elastic drive belts are usually adequate. However, if precision of mechanical movement is important, the pulleys 72, 73 could be replaced by gears and the drive belt 74 could have involute teeth meshing with the gears. Then the movement of lever 70 is precisely related to the movement of gears 72, 73 and the involute teeth on drive belt.

The operation of the elevator of FIG. 2 is seen in FIGS. 3 and 4. The end of shaft 64 carries an integral disc 80 having a diameter which corresponds to a desired excursion of elevator travel. If the diameter of the shaft 64 coincides with the desired movement, disc 80 is not required. An eccentric pin 81 is mounted near the circumference of the disc 80. The elevator shaft 57 includes a horizintally disposed slot 82 which is shaped and proportioned to enable the eccentric pin 81 to travel back and forth as the disc rotates throughout an entire 360° (or such other and more limited travel as may be convenient). It should be noted that for maximum excursion of lever 70, any convenient amount of elevator travel may be provided by the selection of the relative diameters of pulley wheels 72, 73. A minimum shaft 64 rotation of 180° is desired.

When the shaft 64 is rotated in one direction from any given location, elevator shaft 57 raises (FIG. 3) under the urging of pin 81 moving upwardly in slot 82. When shaft 64 is rotated in an opposite direction from the given location, elevator shaft 57 lowers (FIG. 4) under the urging of pin 81 traveling downwardly in slot 82. It should be apparent that any intermediate elevator height may be selected merely by varying the angular rotation of shaft 64. Accordingly, the elevator plate 53, and therefore both the light and the optical lens systems 12, 13, may be moved to scan across the entire width of the microfilm to project any incremental portion of the image stored on the film.

Figure 5:
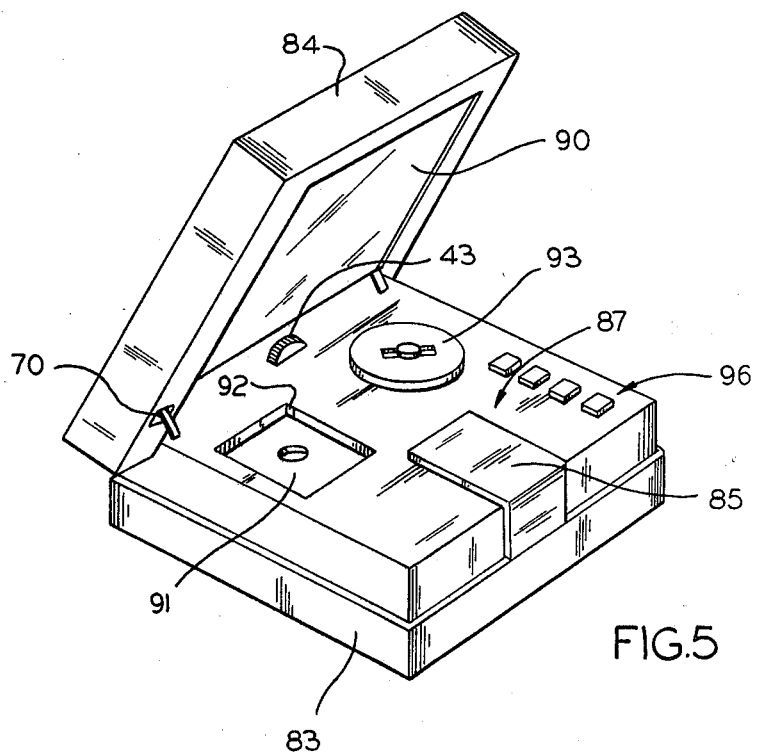
FIG. 5 is a perspective view of an exemplary microfilm reader incorporating the principles of the invention.

FIG. 5 shows an exemplary microfilm reader or reader-printer incorporating the invention. A removable cover 85 may be removed to expose the light and lens systems 12, 13 of FIG. 1. The thumb wheel 43 projects above the surface 87 of the lower shell 83 to enable a vertical orientation of a projected image. A viewing screen 90 is positioned in the upper shell 84 to receive and display an image reflected from mirrors 48, 49 (FIG. 1) and through the interior of shell 84. The control lever 70 is located at any convenient position to enable the vertical movement of the elevator for scanning across the width of the film.

The remaining parts of the microfilm reader of FIG. 5 include a recess 91 for receiving a magazine of microfilm, which advances through a housing slot 92 and film gate 10 (FIG. 1) to a takeup reel 93. Any suitable automatic or manual threading system (not shown) may also be provided. Also, control panel 96 may provide for any suitable control over the operation of the reader or reader-printer.

Those who are skilled in the art will readily perceive how various modifications may be made in the invention without departing therefrom. Accordingly, the appended claims are to be construed broadly enough to cover all equivalents falling within the true scope and spirit of the invention.

I claim:

1. A microfilm reader or microfilm reader-printer for vertically scanning, without having to continuously refocus, across a strip of film in which frames are successively recorded in longitudinal orientation along the length of the film, said reader or reader-printer comprising a chassis; a stationary and vertical with respect to gravity microfilm gate anchored to said chassis, means for supporting said strip of film for transport through said gate while said film is in a vertical orientation, said film gate being shaped and dimensioned to present said successive frames, one at a time; a complete optical system floatingly mounted to move together as a single rigid unit, said complete optical system comprising light system means mounted on one side of said gate and an optical projecting lens and focusing system mounted on the other side of said gate, said focusing system having a telescoping barrel which gives a range of lens travel for focusing and maintaining a focused lens position, said means for mounting said complete optical system including rigid base means for commonly supporting said light system, focusing barrel, lens and focusing system, said base being horizontally-oriented with respect to gravity; elevator means for raising and lowering said base member, relative to said chassis, to raise and lower as a rigid unit at least said floating light, lens barrel, lens, and focusing systems without changing the focus of said telescoping barrel and lens, said elevator means comprising a vertical telescoping shaft with one telescoping part fixed on said chassis and a second telescoping part fixed horizontally on said rigid base means, a height adjusting shaft having opposite ends with an eccentric pin at one end and a means to rotate the opposite end, a horizontally disposed rectangular slot on said second telescoping part which receives said eccentric pin, whereby rotating the adjusting shaft causes the eccentric pin to move within the horizontal slot and raises or lowers the second telescoping part and the image on the film in the vertical gate may be scanned in one dimension transverse to the width of the film, without requiring a refocusing of said telescoping barrel.

2. The reader or reader-printer of claim 1 wherein said light system comprises at least a light source, a condensor lens, and a heat shield mounted on said common rigid base member along with said optical lens system including said telescoping barrel.

3. The reader or reader-printer of claim 1 wherein the means to rotate the shaft includes a pulley mounted at the opposite end of the height adjusting shaft.

* * * * *